US009952061B2

(12) United States Patent
Arlitt et al.

(10) Patent No.: US 9,952,061 B2
(45) Date of Patent: Apr. 24, 2018

(54) DETECTING FRAUD IN RESOURCE DISTRIBUTION SYSTEMS

(71) Applicant: Hewlett-Packard Development Company, L.P., Houston, TX (US)

(72) Inventors: Martin Arlitt, Calgary (CA); Manish Marwah, Palo Alto, CA (US); Amip J. Shah, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 110 days.

(21) Appl. No.: 14/759,682

(22) PCT Filed: Jan. 25, 2013

(86) PCT No.: PCT/US2013/023101
§ 371 (c)(1),
(2) Date: Jul. 8, 2015

(87) PCT Pub. No.: WO2014/116224
PCT Pub. Date: Jul. 31, 2014

(65) Prior Publication Data
US 2015/0323344 A1    Nov. 12, 2015

(51) Int. Cl.
*G01D 4/00* (2006.01)
*G06Q 10/06* (2012.01)
*G06Q 50/06* (2012.01)
*G06Q 20/40* (2012.01)
(Continued)

(52) U.S. Cl.
CPC .............. *G01D 4/002* (2013.01); *G01D 4/00* (2013.01); *G01R 22/066* (2013.01); *G06Q 10/0635* (2013.01); *G06Q 20/4016* (2013.01); *G06Q 50/06* (2013.01); *G01R 19/2513* (2013.01)

(58) Field of Classification Search
CPC .. G01R 22/066; G01R 19/2513; G06Q 50/06; G01D 4/004; G01D 4/002; G01D 4/00; G01D 4/006; H04Q 2209/60; Y02B 90/242; Y04S 20/322; Y04S 20/42; Y04S 50/12
USPC ............ 340/870.02, 870.01; 324/110, 76.11; 705/401, 404, 412
See application file for complete search history.

(56) References Cited

U.S. PATENT DOCUMENTS 7,076,330 B1    7/2006 Dickson
7,236,908 B2 *  6/2007 Timko .................. G06Q 50/06
                                                702/176
(Continued)

FOREIGN PATENT DOCUMENTS

EP          0034031 A1    8/1981
JP       2001-208576 A    8/2001
(Continued)

OTHER PUBLICATIONS

International Searching Authority, The International Search Report and the Written Opinion, dated Oct. 15, 2013, 11 Pages.
(Continued)

*Primary Examiner* — Benyam Haile
(74) *Attorney, Agent, or Firm* — Fabian VanCott (57) ABSTRACT

Detecting fraud in resource distribution systems includes determining a meter of a resource in a resource distribution system exhibits a characteristic indicative of fraud and increasing a collection frequency of measurements of a usage of the resource of the meter per unit of time.

20 Claims, 6 Drawing Sheets (51) Int. Cl.
*G01R 22/06* (2006.01)
*G01R 19/25* (2006.01)

(56) References Cited

U.S. PATENT DOCUMENTS

| | | | | |
|---|---|---|---|---|
| 7,271,735 | B2* | 9/2007 | Rogai | G01D 4/004 324/110 |
| 7,836,111 | B1* | 11/2010 | Shan | G06Q 40/04 708/200 |
| 2008/0109387 | A1* | 5/2008 | Deaver | G01R 19/16547 705/412 |
| 2009/0315535 | A1* | 12/2009 | Lee, Jr. | G01R 22/066 324/110 |
| 2011/0279228 | A1* | 11/2011 | Kumar | G09B 7/00 340/5.83 |
| 2011/0282808 | A1 | 11/2011 | Amram et al. | |
| 2011/0307200 | A1* | 12/2011 | Hsu | G06Q 50/06 702/61 |
| 2012/0022700 | A1* | 1/2012 | Drees | G05B 15/02 700/276 |
| 2012/0158199 | A1 | 6/2012 | Plant | |
| 2012/0232915 | A1 | 9/2012 | Bromberger | |

FOREIGN PATENT DOCUMENTS

| | | |
|---|---|---|
| JP | 3976624 B2 | 9/2007 |
| JP | 2009-139309 A | 6/2009 |
| WO | WO-2012103896 | 8/2012 |

OTHER PUBLICATIONS

Mashima, D. et al., Evaluating Electricity Theft Detectors in Smart Grid Networks, (Research Paper), Sep. 2012, 20 Pages.

Skopik, F., Security is not enough on Privacy Challenges in Smart Grids, (Research Paper), Sep. 2012, pp. 7-14, vol. 1, No, 1.

* cited by examiner

DETECTING FRAUD IN RESOURCE DISTRIBUTION SYSTEMS

BACKGROUND

Many utility providers of electricity, gas, and water use meters located at consumers' residences, businesses, or other buildings that are connected to the utility provider's resource distribution system. These meters collect data regarding how much of the resource the consumer is using. Often, the utility company references the meters on a periodic basis, such as monthly, to determine how much to charge the consumer for their utilization of the resource.

BRIEF DESCRIPTION OF THE DRAWINGS

The accompanying drawings illustrate various examples of the principles described herein and are a part of the specification. The illustrated examples are merely examples and do not limit the scope of the claims.

DETAILED DESCRIPTION

Strains on the resource distribution systems can lead to failures, such as electrical power failures, due to excessive demand for the resource. In particular, when the demand for a resource is higher than the resource distribution outputs, the resource distribution system may fail. However, merely checking a meter on a monthly basis for billing purposes fails to inform the utility providers which of their resource end users are posing risks to their system.

Another risk faced by utility companies is fraud. Some end users purposefully disconnect their meters for short or prolonged periods of time while continuing to use the distribution system's resources without detection. This wrongfully lowers the fraudulent end user's monthly resource consumption bill, but it also misleads the utility provider to believe that there is less demand for the system's resource. As a consequence, a utility provider's output may fall short of the actual demand which can contribute to blackouts or other failures.

The principles described herein include a method for detecting fraud in a resource distribution system. The method includes determining whether a meter of a resource in a resource distribution system exhibits a characteristic indicative of fraud, and if so, increasing a collection frequency of measurements of a usage of the resource of the meter per unit of time. The increased number of measurements resulting from the increased collection frequency can reveal more about the end user's behavior and even recognize resource usage per appliance of the dwellings associated with the meters. In the event that the measurements indicate that appliances, such as furnaces, refrigerators, or other often used appliances are not being used, the system classifies the end users as suspects for fraud. Further investigation will confirm whether the end users are committing fraud, have faulty resource meters, have resource efficient appliances, another situation is present, or combinations thereof. In the event that local laws make a search warrant desirable to execute further investigation of the end user for resource fraud, the system can prepare a report of the information gathered with the increased measurement as evidence that there is reasonable suspicion of fraud.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described is included in at least that one example, but not necessarily in other examples.

Figure 1:
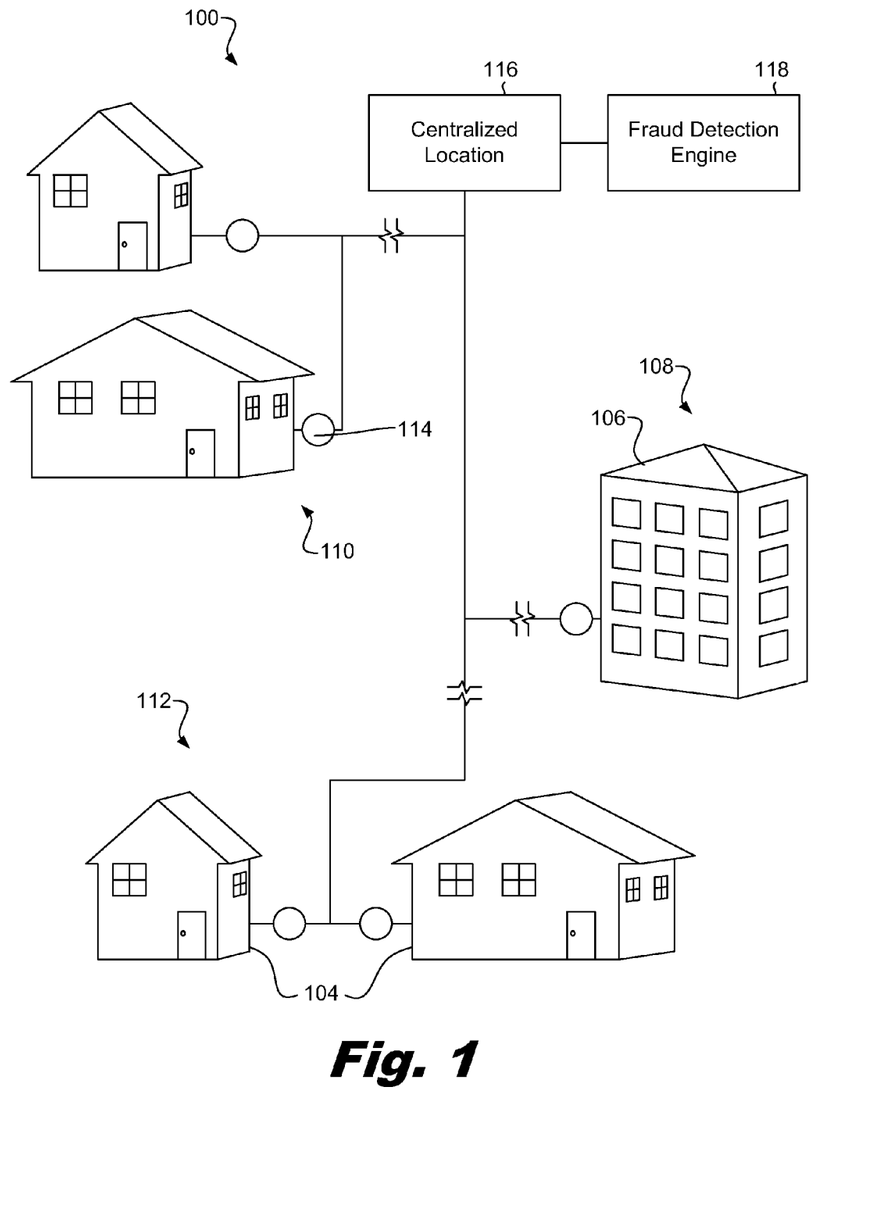
FIG. 1 is a diagram of an example of a resource distribution system according to principles described herein.

FIG. 1 is a diagram of an example of a resource distribution system (100) according to principles described herein. In this example, the resource distribution system (100) distributes a utility resource to dwellings, such as homes (104) and other buildings (106), in different geographic locations (108, 110, 112). The resource may be electricity, gas, water, other resources, or combinations thereof.

Each home (104) and building (106) has a distribution line from the resource distribution system (100) that supplies the resource. A meter (114) is attached to the distribution line, which measures the amount of the resource that passes by the meter into the homes (104) and buildings (106). Each of the meters (114) has the capability of sending its measurements to a centralized location (116) in the resource distribution system (100). The meters (114) transmit the measurements wirelessly to the centralized location (116) or the meters transmit the measurements on an electrically conductive medium wired into the resource distribution system (100). The measurements may be a total measurement since the meter was activated, or the measurements may be the total measurement since the last measurement was reported. In addition to sending the measurement information, the meters (114) may also send other data, such as geographic location of the dwelling, size of the dwelling, type of dwelling, user end identification, other information, or combinations thereof. The measurement data may include overall consumption of the resource, reactive power measurements, voltage measurements, current measurements, other measurements, or combinations thereof.

A fraud detection engine (118) is in communication with the resource distribution system (100). The fraud detection engine (118) may be located in a single location or distributed across multiple devices, such as at each of the meters. The fraud detection engine (118) sorts through the information gathered about the meters (114) for behaviors or other characteristics that are indicative of fraud. The fraud detection engine (118) may use the supplemental information to determine which end users have characteristics indicative of fraud. For example, if a measurement for a meter is below a predetermined threshold amount for consuming the system's resource for a dwelling of a particular size and type, then this finding can be indicative of fraud. In other examples, the fraud detection engine may group meters with common characteristics, such as dwelling size, dwelling type, dwelling geographic location, other characteristics, or combinations thereof into groups and compare the resource consumption of each meter to the other meters within its group. The fraud detection engine (118) may automatically determine that a predetermined percentage of each group have a characteristic indicative of fraud. For example, the fraud detection engine (118) may determine that the bottom five percent of consumption users in each group should be further investigated for fraud. In yet other examples, the fraud detection engine (118) may determine that where the resources passing through a pump, relay station, transmitter, or other device in the resource distribution system (100) measures a greater amount of resource passing by than the collective amount measured by all of the meters downstream of such a measurement, then all of the end users downstream of such measured loss exhibit a characteristic indicative of fraud. In such an event, all of the downstream meters are further investigated for fraud by increasing the collection frequency of measurements taken during a unit of time.

For example, if a user is determined to exhibit a characteristic that is indicative of fraud, and the measurements taken of that meter are collected on a monthly basis, the collection frequency may be increased so that the measurements are collected on a daily basis. If the daily collection of measurements reveals that fraudulent activity may be occurring, then the collection frequency may be increased to collecting the measurements on an hourly basis. If signs of fraudulent activity continue, the collection frequency is increased to every minute or less. If the end user's behavior still suggests that fraudulent activity is likely with such a small collection interval, the fraud detection engine (118) will classify the end user associated with this meter as a suspect for fraudulent activity. As a result, the meter associated with the suspected end user will be further investigated for fraud, intentional malfunction (tampering), unintentional malfunction (failure) and/or damage.

While a high frequency of measurement collections will provide the best indication of which users are committing fraud, a high collection frequency uses a lot of bandwidth and memory storage. Consequently, such frequent collections are costly. By applying the increased collection frequency to just those end users with characteristics indicative of fraud, the fraud detection engine saves time and money. Further, by progressively increasing the collection frequency of measurements, the fraud detection engine (118) limits the number of recorded measurements to a minimal amount for detecting activity indicative of fraud.

Not all of the dwellings which have characteristics indicative of fraud (100) will actually be committing fraud. For example, an end user using energy efficient appliances may exhibit a characteristic indicative of fraud because its resource consumption is substantially lower than other end users with dwellings of similar size.

The fraud detection engine (118) periodically or continuously monitors the meters of the resource distribution system (100) for signs of fraud. As a result, those dwellings with energy efficient appliances will reappear during each analysis. To streamline the process, once end users have been deemed to be non-fraudulent even though they have characteristics indicative of fraud, the fraud detection engine (118) places such end users on a list that indicates they are non-fraudulent. As a result, the fraud detection engine (118) will skip evaluating the non-fraudulent end users if they are detected during future analysis. However, since circumstances change, the non-fraudulent end users will be subjected to future analysis after a predetermined wait period.

The fraud detection engine (118) can prepare a report summarizing the dwellings that are suspected of fraudulent activity. Further inspection of the meters associated with the dwellings may confirm whether a user is fraudulent or whether the dwellings should be placed on a non-fraudulent list.

Figure 2:
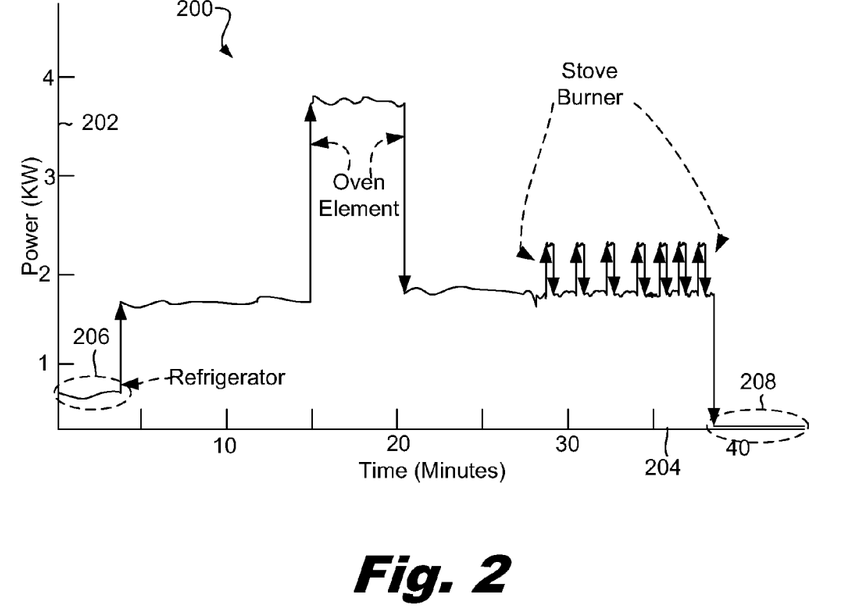
FIG. 2 is a chart of an example of appliance usage according to principles described herein.

FIG. 2 is a chart (200) of an example of appliance usage according to principles described herein. In this example, the resource distribution system is an electricity distribution system. The y-axis (202) schematically represents power measured in kilowatts of a meter associated with a dwelling of an end user, and the x-axis (204) schematically represents time measured in minutes.

With an increase in the collection frequency, the appliance usage in the dwelling can be seen with the rising and falling of the power levels used in the dwellings. For example, a dwelling may have a base power consumption that powers the continuously operating appliances in a home. In this example, region (206) schematically represents the base power level. However, in the example of FIG. 2, as appliances are turned on, an abrupt power consumption occurs where the amount of power consumed shifts up. Likewise, as the appliances are turned off, a corresponding drop in the power consumption also occurs. In other examples, the rise and fall of the power consumption will not be as abrupt. For example, an oven may be progressively turned up or down depending on the end user's behavior. However, a significant number of appliances will create abrupt rises and falls in power consumption. In the example of FIG. 2, the rises and falls due to refrigerators, ovens, and stove burners are depicted. However, other appliances may be visible on a chart created with the increased number of recorded measurements. Other such appliances may include light switches, microwaves, water heaters, washing machines, dryers, dishwashers, furnaces, air conditioners, televisions, computers, other appliances, or combinations thereof.

Fraudulent end users may disconnect the meter from the power line so that their electricity consumption is not recorded. In some cases, the end user disconnects the meter for a couple of days or for a shorter amount of time. Some end users may disconnect the meter during times when a fraudulent end user does not believe that he will get caught, such as at night. When the meter is disconnected, none of the power consumption in the dwelling will be recorded until the power meter is reconnected to the power line. As a result, the power consumption level will drop to zero while the meter is disconnected. In other examples, the meter is just partially disconnected. In such an example, the meter may bypass just some of the electric circuits in the dwelling resulting in a lower or near zero recorded power consumption. In the example of FIG. 2, region (208) schematically represents where the meter has been disconnected. In another example, the user may tamper with the meter to avoid additional energy usage from being billed—for example, by reversing the polarity of the meter. In other examples, region (208) characterizes a broken meter, which may be broken as a result of tampering by a fraudulent end user or through no fault of the end user. Thus, while region (208) creates a suspicion of fraud, it does not generate proof of fraud. However, region (208) is indicative of an issue that should be resolved and merits further investigation.

While some fraudulent activity causes a meter to stop measuring the resource consumption, such as completely disconnecting the meter from the distribution line, other forms of tampering are more sophisticated and merely lower the meter's measurements. In such examples, having a detailed breakdown of resource consumption per appliance may allow the utility provider to detect fraud easier.

Figure 3:
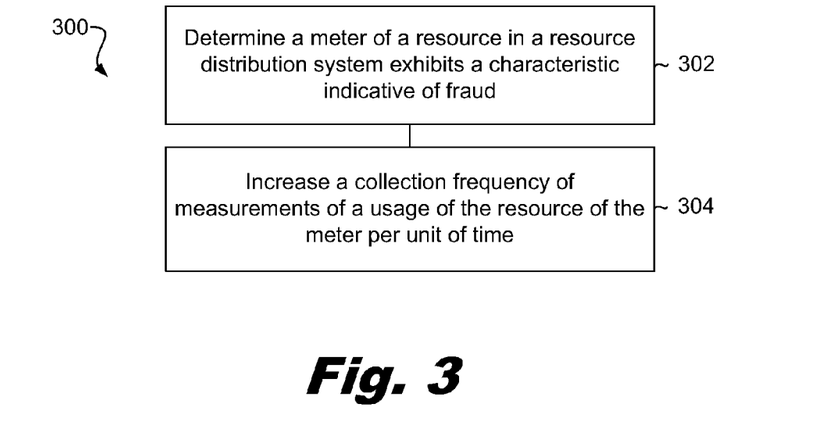
FIG. 3 is a diagram of an example of a method for detecting fraud in resource distribution systems according to principles described herein.

FIG. 3 is a diagram of an example of a method (300) for detecting fraud in resource distribution systems according to principles described herein. In this example, the method (300) includes determining (302) a meter of a resource in a resource distribution system exhibits a characteristic indicative of fraud and increasing (304) a collection frequency of measurements of a usage of the resource of the meter per unit of time. The resource in the resource distribution system is water, gas, electricity, another resource, or combinations thereof.

The characteristics indicative of fraud may include having the usage of the resource being below a predetermined threshold for a billing cycle. In other examples, the characteristic includes having the usage of the resource being within a bottom of a predetermined usage percentage of meters associated with comparable dwellings. In yet other examples, the characteristic includes being connected to a portion of the resource distribution system that measured a loss of the resource.

The initial collection interval may include collecting the measurements once per billing cycle, such as once a month. However, when a characteristic indicative of fraud is exhibited, the collection interval may be shortened to a shorter interval to investigate the fraud remotely. Collecting the measurements on a more frequent basis may include decreasing the collection interval to be less than one hour. In other examples, collecting the measurements on a more frequent basis includes decreasing the collection interval to be less than one minute. The collection interval may be reduced to once a second. Such increased collection frequencies will result in fine-grained data that reveals the user's resource consumption behavior. In some examples, the fraud detection engine will recognize resource usage per appliance from the increased number of recorded measurements. In addition to collecting the overall resource consumption measurements, the meter may report other parameters during each collection. Other such parameters may include reactive power, voltage, current, power frequency, other parameters, and combinations thereof. These additional parameters may be considered when determining whether fraud exists.

Figure 4:
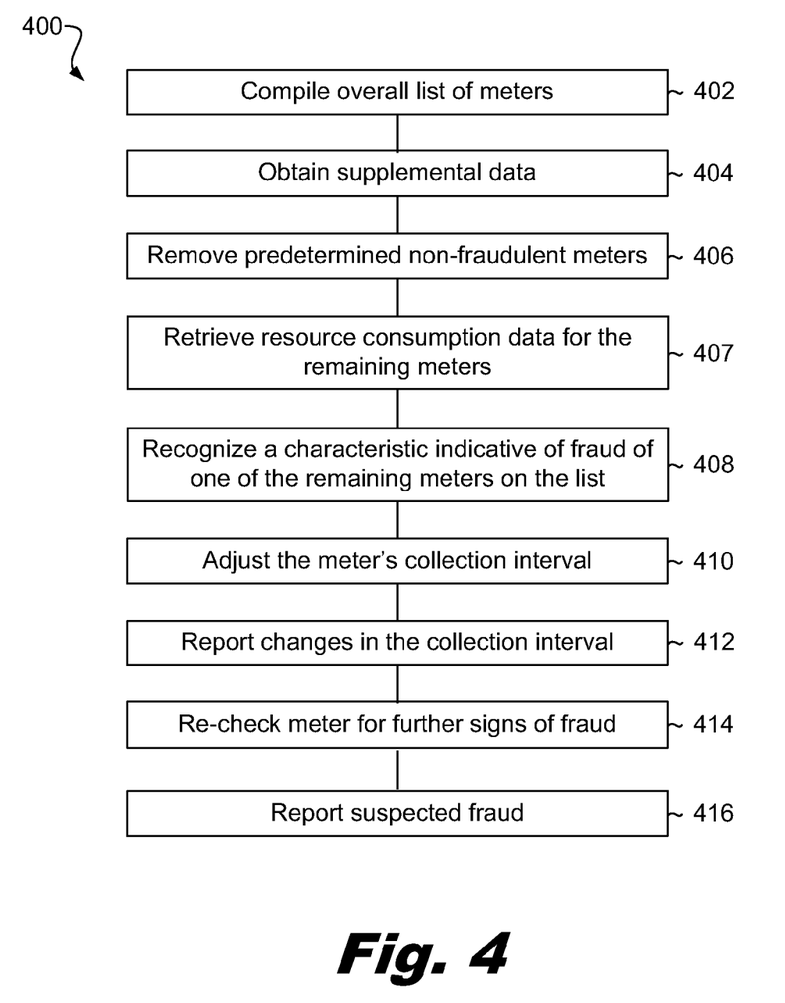
FIG. 4 is a diagram of an example of a method for detecting fraud in resource distribution systems according to principles described herein.

FIG. 4 is a diagram of an example of a method (400) for detecting fraud in resource distribution systems according to principles described herein. In this example, the method (400) includes compiling (402) an overall list of meters and obtaining (404) supplemental data. In some examples, the supplemental data is used to determine which of the meters have previously been identified as non-fraudulent users. Those meters that have been previously investigated and determined to be non-fraudulent although they previously exhibited a characteristic indicative of fraud are removed (406) from further investigation. Also, the supplemental data may also include other information, such as historical weather information and the geographical regions where the dwellings are located. For example, on days with extreme hot or cold weather conditions within identified geographic locations, the utility provider would expect to see corresponding consumption behavior with the dwelling's heating and air conditioning systems. Additionally, the utility provider may expect to see different levels of gas consumption according to the recorded weather patterns.

Next, resource consumption data is retrieved (407) for the remaining meters on the list. The method (400) also includes recognizing (408) a characteristic indicative of fraud of one of the meters remaining on the list. In response to recognizing the characteristic, the collection frequency of measurements is adjusted (410) on that particular meter. The changes in the collection interval are reported (412) and the meter is re-checked (414) after recording finer-grain data with the increased collection frequency for further signs of fraud. If fraud is continued to be suspected, the fraud is reported (416).

Given a list of meters and a set of supplemental data, each meter is checked for characteristics of fraudulent activity. If the meter is currently reporting the measurements with a long collection interval length, such as once per day or more, then some simple tests are applied. If those simple tests do not suggest the meter is free of fraudulent behavior, then the data collection interval length is decreased, so that finer-grained data is collected and more sophisticated tests can be applied after a sufficient amount of finer-grained data has been collected. If a meter still shows signs of potentially fraudulent activity after collecting more detailed meter data, such as once per second, then the end user associated with the meter is classified as being a suspect of fraudulent activity. Actions can be taken to address the fraud, such as by dispatching a technician to the dwelling or remotely turning off access to the resource.

The principles described herein use meters that have an ability to report data to a remote location. Further, the meters can have their collection interval length changed remotely. Also, the meters are capable of reporting measurements with very short collection intervals, such as a collection interval every second. Such short collection intervals are not employed on every meter as such fine-grained data occupy large amounts of storage space and network bandwidth that would be prohibitively expensive. However, collecting fine-grained data for selected dwellings on a demand basis will add minimal overhead to the system, while providing significant value to the business as a result.

The list of the compiled meters to check may be the entire set of meters belonging to a utility or a subset thereof. The subset can be of users from a particular geographic location, end users who consume below an average amount of the resource compared to other end users with dwellings of similar size and type. Also, the subset could be a list of end users that have been previously flagged for closer scrutiny.

The supplemental data may include other information that would be helpful for detecting possible fraudulent activity. For example, a data quality assessment may find that the set of dwellings attached to a transformer (for electricity distribution systems) or pump (for water distribution systems) are reporting consumption of substantially fewer resources than was delivered to the transformer or pump. Such characteristics may be exhibited for certain types of fraud. For example, a common method of attempting resource fraud is to siphon the resources before the resource reaches the meter.

The fraud detection engine may reference a list of identified "non-fraudulent" dwellings. Such a list is stored locally, stored at the meters belonging to the list, stored remotely such as in a device of a network, other locations, or combinations thereof. In examples, where the list is stored at the meters, the list may be encrypted to prevent tampering. Since non-fraudulent end user can change their behavior in the future, the members of such a list are periodically rechecked.

Any appropriate approach for analyzing the meters on the list may be used in accordance with the principles described herein. In some examples, the list is broken down into any appropriate number of sub-lists where each sub-list is analyzed by a separate system. In other examples, a workload balancer is used to assign the next available meter in the list to the first available analysis system. In yet other examples, the fraud detection engine uses a parallelized analysis system that appears as a sequential system to the user.

The level of analysis performed for each meter depends on the duration of the collection interval. If just coarse-grained data is available, such as one measurement per month, then just simple tests will be applied. If the meter fails these tests, then the data collection interval is decreased, and the meter is classified as a meter of interest. After decreasing the collection intervals, the fraud detection engine waits for new data to be collected with the shorter interval. The analysis program records the name of the meter and then goes on to process the next meter in the list. The meter with the decreased collection interval can be cycled back through the list while the new measurements are collected with the shorter collection interval.

As the collection interval decreases, more sophisticated tests can be applied. For example where electricity is the resource, most dwellings have a base load and a variable load component to their resource consumption. If the base load goes to zero units of consumption or the total load (the base and the variable loads) go to zero units of consumption, the fraud detection engine recognizes further signs of fraud because such measurements are atypical for most dwellings. Dwellings with local energy sources such as solar panels may draw such low measurement for a public resource distribution system, but through mechanisms such as physical investigation such dwellings will be added to the non-fraudulent list.

Once the meter data becomes available at a sufficiently fine granularity, even more sophisticated techniques can be applied. In particular, the resource consumption could be disaggregated to determine per-appliance use. For example, if a dwelling appears to contain no large appliances such as HVAC, stoves/ovens, refrigerators, and so forth, the dwelling is tagged for a closer inspection. In such examples, the detailed meter data can be retained for a longer period of time to prove that the end user owes compensation to the utility provider. The dwellings that still appear to have suspicious consumption patterns are given the highest priority. High priority dwellings may be addressed by sending technicians to inspect the meters at these dwellings.

If a dwelling is determined to have acceptable characteristics after some amount of analysis has been performed on that meter, then the meter's collection interval is returned to its original time duration to minimize the overhead on the meter and the system. Further, the fine-grained data stored in the system about this meter is aggregated up to the original level, and the detailed records about the meter are deleted to further reduce the overhead on the system. The detailed records may be retained for a certain length of time before the aggregation occurs just in case the dwelling is flagged again as having demonstrated potentially fraudulent activity.

The tests used by the fraud detection engine for recognizing warning signs can involve building profiles or models of the dwelling's consumption behavior. Retaining historical usage records of a dwelling's consumption can be used to look for significant changes in the consumption.

The supplemental data can include any appropriate type of information. For example, the supplemental data may include the sales history of a dwelling, which can indicate when different occupants have moved in and possibly installed new appliances with different resource consumption rates.

The supplemental data can also provide alternative mechanisms to identify the resource consumption per appliances in a dwelling. Thus, a refinement to the previously described example above includes increasing the number of metrics that are recorded. For examples with an electrical distribution system, in addition to just collecting real power consumed, metrics for billing purposes, reactive power, voltage, current, power frequency, other metrics, and combinations thereof can also be recorded. Collecting additional metrics provides additional information that may help to uncover meters that are malfunctioning or have been tampered with. For example, a change point detection mechanism can be used to determine when material changes in the character of a univariate or multivariate time series occur. Such time series would relate to current, voltage, power, other parameters, or combinations thereof. Such mechanisms include the use of control charts, hypothesis testing, methods that estimate the probability density of a variable from data, and then estimating the likelihood of a particular data point being drawn from that distribution, using clustering to segment the time-series into homogenous sections, methods based on looking at the information content of the above mentioned time series, other mechanisms, or combinations thereof.

Figure 5:
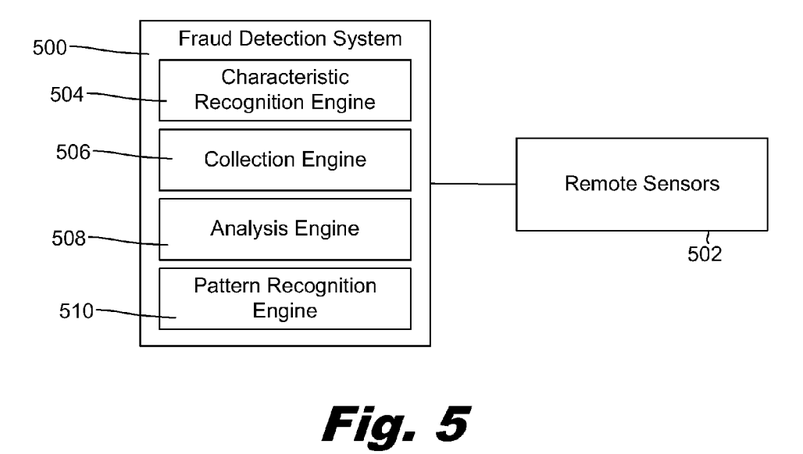
FIG. 5 is a diagram of an example of a fraud detection system according to principles described herein.

FIG. 5 is a diagram of an example of a fraud detection system (500) according to principles described herein. In this example, the fraud detection system (500) is in communication with remote meters (502) distributed throughout the resource distribution system. The fraud detection system (500) includes a characteristic recognition engine (504), a collection engine (506), an analysis engine (508), and an appliance usage recognition engine (510). The engines (504, 506, 508, 510) refer to a combination of hardware and program instructions to perform a designated function. Each of the engines (504, 506, 508, 510) may include a processor and memory. The program instructions are stored in the memory and cause the processor to execute the designated function of the engine.

The characteristic recognition engine (504) recognizes when a meter is exhibiting a characteristic that is indicative of fraud. The collection engine (506) controls the collection intervals of the meters. Thus, in response to recognizing the characteristics indicative of fraud, the collection engine (506) adjusts the rate at which measurements are reported by a meter, if appropriate. Also, when a meter's collection interval has been increased, but the meter is determined to pose little risk of fraud, the collection engine (506) resets the collection interval to the original collection frequency. The analysis engine (508) analyzes the data from the increased number of measurements, and the appliance usage recognition engine (510) may recognize the energy consumption per appliance within an end user's dwelling.

Figure 6:
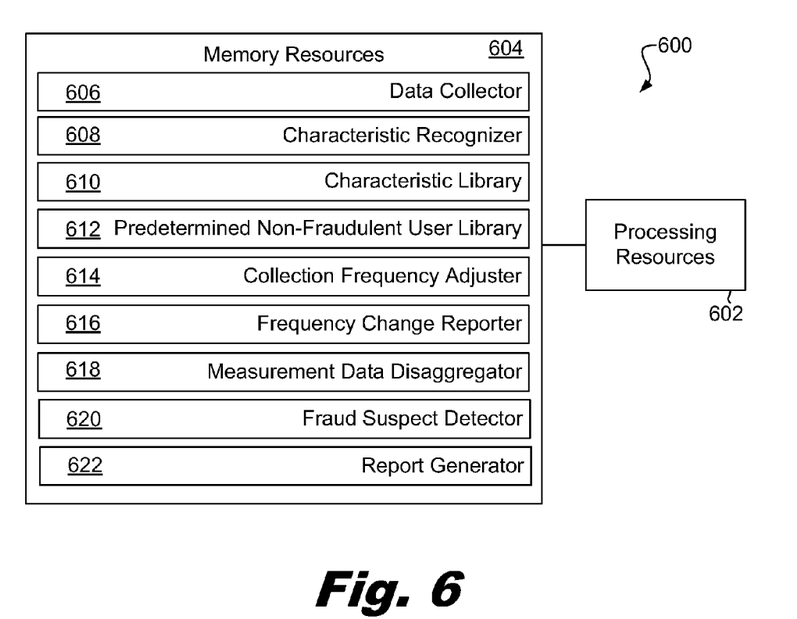
FIG. 6 is a diagram of an example of a fraud detection system according to principles described herein.

FIG. 6 is a diagram of an example of a fraud detection system (600) according to principles described herein. In this example, the fraud detection system (600) includes processing resources (602) that are in communication with memory resources (604). Processing resources (602) include at least one processor and other resources used to process programmed instructions. The memory resources (604) represent generally any memory capable of storing data such as programmed instructions or data structures used by the fraud detection system (600). The programmed instructions shown stored in the memory resources (604) include data collector (606), a characteristic recognizer (608), collection frequency adjuster (614), frequency change reporter (616), measurement data disaggregator (618), fraud suspect detector (620), and a report generator (622). The data structures shown stored in the memory resources (604) include a characteristic library (610) and a predetermined non-fraudulent user library (612).

The memory resources (604) include a computer readable storage medium that contains computer readable program code to cause tasks to be executed by the processing resources (602). The computer readable storage medium may be tangible and/or non-transitory storage medium. The computer readable storage medium may be any appropriate storage medium that is not a transmission storage medium. A non-exhaustive list of computer readable storage medium types includes non-volatile memory, volatile memory, random access memory, memristor based memory, write only memory, flash memory, electrically erasable program read only memory, or types of memory, or combinations thereof.

The data collector (606) represents programmed instructions that, when executed, cause the processing resources (602) to collect data from the meters at a predetermined collection interval. In other examples, the data is retrieved from an intermediary, such as the central location (116, FIG. 1). The meters are continuously metering the resource consumption at the dwelling, and the collection interval is the time between when the consumption level measured with the meters is reported. The characteristic recognizer (608) represents programmed instructions that, when executed, cause the processing resources (602) to recognize when a meter exhibits a characteristic that is indicative of fraud. The characteristics indicative of fraud is meter specific. In other examples, the characteristic indicative of fraud is shared by a group of meters, such as when there is a resource consumption difference measured between an upstream location in the resource distribution system and the downstream meters collectively. The various characteristics that are indicative of fraud are stored in a characteristic library (610), and the characteristic recognizer (608) consults the characteristic library (610) to determine when a meter exhibits such characteristics.

For those meters exhibiting characteristics indicative of fraud, but are listed in a predetermined non-fraudulent user library (612), such meters are removed from further analysis. As a result, these meters are not subjected to increased collection frequencies. Meters may be added to the predetermined non-fraudulent user library (612) as they are determined to have legitimate measurements being reported. For example, if an end user replaces many of the appliances in a dwelling with more resource consumption efficient appliances, the meter associated with the end user may drop to a level that causes the end user to have a characteristic indicative of fraud. However, upon physical inspection, the utility provider will determine that the lower resource consumption measurements are legitimate due to the resource efficient appliances. While such an end user will continue to exhibit characteristics indicative of fraud due to the low resource consumption, the fraud detection system (600) will save resources by not subjecting the meter associated with such an end user to increased collection frequencies and additional analysis.

The collection frequency adjuster (614) represents programmed instructions that, when executed, cause the processing resources (602) to increase the collection frequency of the meters that are not listed in the predetermined non-fraudulent user library (612) when they exhibit characteristics indicative of fraud. The frequency changer reporter (616) represents programmed instructions that, when executed, cause the processing resources (602) to report when the collection frequency is changed. The measurement data disaggregator (618) represents programmed instructions that, when executed, cause the processing resources (602) to break down the measurements reported to analyze the resource consumption measurements. The measurement data disaggregator (618) consults the reported adjusted collection frequency and determines whether signs of fraud are continued to be exhibited by the meter. If not, the measurement data disaggregator (618) causes the collection frequency adjuster (614) to reset the collection frequency back to the meter's original collection frequency. If signs of fraud continue to manifest, the measurement data disaggregator (618) causes the collection frequency adjuster (614) to increase the collection frequency again until the collection interval is decreased to a very short interval, such as collection intervals that are less than one minute apart. The fraud suspect detector (620) represents programmed instructions that, when executed, cause the processing resources (602) to detect fraud at the very short collection interval. The report generator (622) represents programmed instructions that, when executed, cause the processing resources (602) to report the meters suspected of fraud.

Further, the memory resources (604) may be part of an installation package. In response to installing the installation package, the programmed instructions of the memory resources (604) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the processing resources (602) and the memory resources (604) are located within the same physical component, such as a server, or a network component. The memory resources (604) may be part of the physical component's main memory, caches, registers, non-volatile memory, or elsewhere in the physical component's memory hierarchy. Alternatively, the memory resources (604) may be in communication with the processing resources (602) over a network. Further, the data structures, such as the libraries and may be accessed from a remote location over a network connection while the programmed instructions are located locally. Thus, the fraud detection system (600) may be implemented on a user device, on a server, on a collection of servers, or combinations thereof.

The fraud detection system (600) of FIG. 6 may be part of a general purpose computer. However, in alternative examples, the fraud detection system (600) is part of an application specific integrated circuit.

Figure 7:
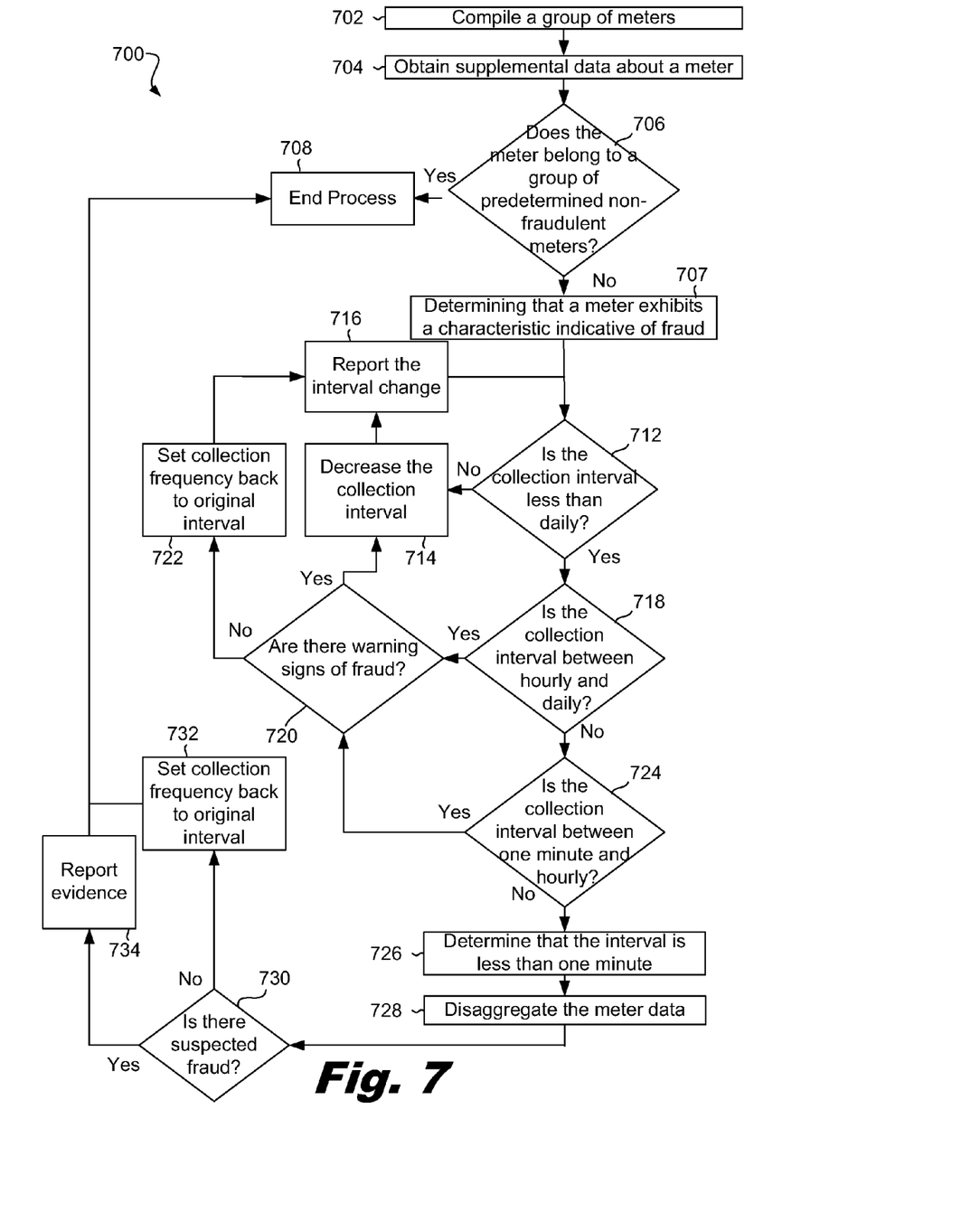
FIG. 7 is a diagram of an example of a flowchart of a process for detecting fraud in resource distribution systems according to principles described herein.

FIG. 7 is a diagram of an example of a flowchart (700) of a process for detecting fraud in resource distribution systems according to principles described herein. In this example, the process includes compiling (702) a group of meters and obtaining (704) supplemental data from the compiled group. The process also includes determining (706) whether the meter belongs to a group of predetermined non-fraudulent users. If so, then the process ends (708).

If the meter does not belong to the group of predetermined non-fraudulent users, then the process includes determining (707) that a meter exhibits the characteristic indicative of fraud and determining (712) whether the collection interval is less than daily. If the collection interval is not less than daily, then the collection interval is decreased (714) and the changes to the collection interval are reported (716).

If the collection interval is less than daily, then the process includes determining (718) whether the collection interval is between hourly and daily. If the collection interval is between daily and hourly, then the process determines (720) whether there are warning signs of fraud. If there are warning signs of fraud, the collection interval is decreased (714), and the interval change is recorded (716). However, if no warning signs of fraud exist, then the collection frequency is set (722) back to its original collection interval.

If the collection interval is not between hourly or daily, then the process includes determining (724) whether the collection interval is between one minute and hourly. If the collection interval is between one minute and hourly, then the process proceeds to determine (720) whether there are signs of fraud. If so, the collection interval is decreased (714) again, the interval change is recorded (716). If there are no signs of fraud, and the collection frequency is reset (722) to its original collection frequency, the change is recorded (716).

If the collection interval is not between one minute and hourly, then the process determines (726) that the interval is less than one minute, and disaggregates (728) the meter data. The disaggregation allows the process to see appliance usage. The process determines (730) if there is suspected fraud. If there is no suspected fraud, the collection interval is reset (732) and the change is reported. If there is suspected fraud, then the fraud (and evidence of it) is reported (734).

In some examples, appliance use in the dwellings is retained for future use, such as for comparison during future investigations. The process may also include an analysis to identify the appliance use in each dwelling at times when the end user is not suspected of committing fraud. This information may be used later as a baseline for future investigations. To prioritize which of the end users will be subjected to an appliance identification process, the system may use multiple factors. Such factors may include credit scores, credit ratings, past history, payment history (such as a history of making late payments or a history of making complaints to the utility provider), other factors, or combinations thereof.

Figure 8:
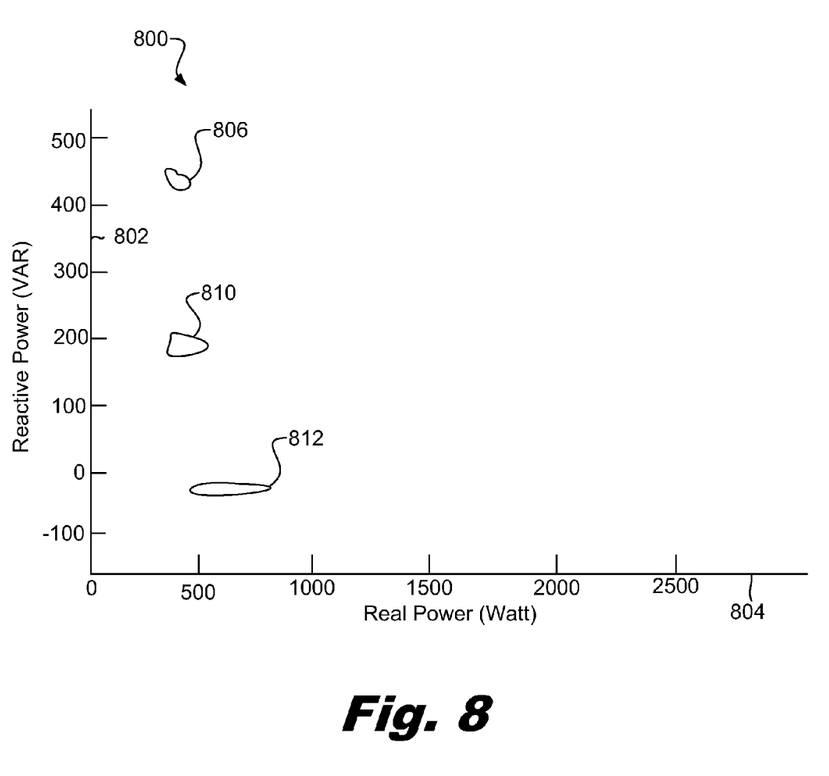
FIG. 8 is a chart of an example for determining resource usage per appliance according to principles described herein.

FIG. 8 is a chart (800) of an example for determining resource usage per appliance according to principles described herein. In this example, the resource distribution system is an electricity distribution system. The y-axis (802) schematically represents reactive power measured in VAR associated with a dwelling of an end user, and the x-axis (804) schematically represents power measured in watts.

Supplemental data, such as reactive power, may be used to help determine which appliances in the dwelling are being used. Reactive power is a property exhibited in alternating current applications, such as home appliance applications, where the coils and/or capacitors of the appliances store electrical energy and release that power. Both the storage and the release occur during the same alternating current cycle. The reactive power measurements can be used to identify the operation of appliances based on the supplemental data provided to the fraud detection engine. In this example, measurements (806) indicate the use of a refrigerator, measurements (810) indicate the use of a garage door opener, and measurements (812) indicate the use of a light and fan. In other examples, other measurements indicate the use of other appliances. Such measurements indicate the use of the appliance, which the utility provider can analyze to determine if the end user's behavior is indicative of fraud. For example, such measurements may be used in isolation to determine characteristics indicative of fraud. In other examples, these measurements are compared to one of the overall consumption recordings to determine if the measurements of both the reactive power and the over consumption are consistent. The supplemental data may include other parameters, which may be used to determine other details about the end user's resource consumption behavior.

While the examples above have been described with reference to specific types of resource distribution systems and types of sensors, any appropriate type of distribution system and/or remote meters may be used in accordance with the principles described herein. The resource distributed with the resource distribution system may be any appropriate resource, such as water, electricity, gas, natural resource, synthetic resource, another resource, or combinations thereof.

While the examples above have been shown with reference to specific mechanisms for determining the amount of resource used per appliance, any appropriate mechanism may be used in accordance with the principles described herein. While the examples above have been described with reference to specific appliance and dwelling types, any appliance and dwelling types may be incorporated into the resource distribution system and use the principle described herein.

While the application above has been described with reference to specific types of supplemental data, any appropriate supplemental data may be used. Further, while the principles described above have been described with reference to specific mechanisms for determining that a user should be included in a predetermined non-fraudulent user list and/or group, any appropriate mechanism may be used. Also, the examples above have been described with reference to specific types of characteristics that an end user may be involved in a fraudulent activity, any appropriate characteristics indicative of fraud may be used. Further, while the examples above have been described with specific rules for how and when to adjust the collection frequency of the meters, any appropriate rules for how and when to adjust the collection frequencies may be used.

The principles described herein include any appropriate mechanism for reporting fraud. For example, the suspected fraud may be part of an official report that is sent to an appointed individual at the utility provider. In other examples, the report is made with an email or text. Other appropriate mechanism for reporting the fraud may be used in accordance with the principles described herein.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A method for detecting fraud in resource distribution systems comprising:
   receiving transmissions of data from a meter that is monitoring use of a resource in a resource distribution system;
   determining that the meter exhibits a characteristic indicative of fraud;
   in response to determining that said meter exhibits a characteristic indicative of fraud, increasing a collection frequency of measurements of a usage of said resource of said meter per unit of time;
   evaluating resource usage measured with said meter at said increased collection frequency;

determining from said evaluation of resource usage at the increased collection frequency whether to further investigate said meter for fraud; and comparing meter data from a set of dwellings to data collected from a resource distribution device to further investigate for fraud and prevent blackouts and other system failures.

2. The method of claim 1, further comprising evaluating resource usage per appliance of a dwelling measured with said meter from said increased collection frequency.

3. The method of claim 1, wherein said characteristic indicative of said fraud comprises having said usage of said resource being below a predetermined threshold for a billing cycle.

4. The method of claim 1, wherein said characteristic indicative of said fraud comprises having said usage of said resource being within a bottom of a predetermined usage percentage of meters associated with comparable dwellings.

5. The method of claim 1, wherein said characteristic indicative of said fraud comprises being connected to a portion of said resource distribution system that measured a loss of said resource.

6. The method of claim 1, further comprising recording at least one additional parameter other than resource usage at said meter.

7. The method of claim 1, wherein said resource is water, gas, electricity, or combinations thereof.

8. The method of claim 1, wherein increasing said collection frequency of said usage of said resource of said meter per said unit of time comprises decreasing a collection interval.

9. The method of claim 1, wherein increasing said collection frequency of said usage of said resource of said meter per said unit of time comprises decreasing a collection interval to one second.

10. The method of claim 1, comprising, in response to a determination to further investigate said meter for fraud:
    determining if the meter continues to exhibit a characteristic of fraud; and
    in response to determining that the meter exhibits a characteristic of fraud, remotely turning off access to the resource.

11. A system for detecting fraud in resource distribution systems, comprising:
    a recognition engine to:
        recognize a characteristic indicative of fraud for a meter of a resource in a resource distribution system; and
        maintain a list of users deemed to be non-fraudulent and ignore a characteristic indicative of fraud at a meter corresponding to a user on said list for a predetermined amount of time;
    a collection engine to increase a collection frequency of a measurement of a usage of said resource of said meter per unit of time in response to recognition of a characteristic indicative of fraud at said meter by the recognition engine; and
    an analysis engine to analyze an output of said increased collection frequency.

12. The system of claim 11, further comprising an appliance usage recognition engine to recognize a resource usage per appliance of a dwelling with said meter from said increased measurements.

13. The system of claim 11, wherein said characteristic indicative of said fraud is connected to a portion of said resource distribution system measuring a loss of said resource.

14. The system of claim 11, further comprising a recording engine to record at least one additional parameter other than usage of said resource at said meter.

15. The system of claim 11, said collection engine to, in response to continued recognition of a characteristic indicative of fraud after said increase in collection frequency, again increase the collection frequency of the measurement of usage of said resource by said meter per unit of time.

16. The system of claim 11, said recognition engine to use supplemental data comprising historical weather information to recognize a characteristic indicative of fraud.

17. The system of claim 11, said collection engine to decrease the collection frequency of the usage measurement of said meter to a previous collection frequency in response to there being no characteristic indicative of fraud for a predetermined period of time.

18. The system of claim 11, wherein said analysis engine further comprises a change point detection mechanism to determine when material changes in a univariate or multivariate time series occur.

19. A computer program product for detecting fraud in resource distribution systems, comprising:
    a non-transitory computer readable storage medium, said non-transitory computer readable storage medium comprising computer readable program code embodied therewith, said computer readable program code comprising program instructions that, when executed, causes a processor to:
        determine if a meter of a resource in a resource distribution system exhibits a characteristic indicative of fraud;
        record said meter in a list of meters suspected of fraud within the resource distribution system;
        increase a collection frequency of measurements of a usage of said resource of said meter per unit of time;
        analyze said measurements from said increased collection frequency;
        from the list of recorded meters, prioritize which of the meters will be subjected to an appliance identification process; and
        recognize a resource per usage per appliance in a dwelling with said meters from said measurements.

20. The computer program product of claim 19, further comprising computer readable program code comprising program instructions that, when executed, causes said processor to prioritize which of the meters will be subjected to an appliance identification process by analyzing credit scores, credit ratings, past history, payment history, complaint history or a combination thereof.

* * * * *